United States Patent
Anick et al.

(10) Patent No.: US 6,778,975 B1
(45) Date of Patent: Aug. 17, 2004

(54) SEARCH ENGINE FOR SELECTING TARGETED MESSAGES

(75) Inventors: Peter Anick, Marlboro, MA (US);
Farzin Maghoul, Hayward, CA (US);
Johannes L. Marais, Mountain View, CA (US); Laurent Chavet, San Mateo, CA (US)

(73) Assignee: Overture Services, Inc., Pasadena, CA (US)

( * ) Notice: Subject to any disclaimer, the term of this patent is extended or adjusted under 35 U.S.C. 154(b) by 256 days.

(21) Appl. No.: 09/799,863

(22) Filed: Mar. 5, 2001

(51) Int. Cl.[7] .............................................. G06F 17/30
(52) U.S. Cl. ................................ 707/1; 707/2; 707/102
(58) Field of Search ........................................ 707/1–10

(56) References Cited

U.S. PATENT DOCUMENTS

| | | | | |
|---|---|---|---|---|
| 5,630,125 A | * | 5/1997 | Zellweger ............... | 707/103 R |
| 5,943,669 A | * | 8/1999 | Numata ................... | 707/5 |
| 5,983,221 A | * | 11/1999 | Christy ................... | 707/5 |
| 5,991,756 A | * | 11/1999 | Wu ......................... | 707/3 |
| 6,006,221 A | * | 12/1999 | Liddy et al. ............. | 707/5 |
| 6,073,167 A | * | 6/2000 | Poulton et al. ......... | 709/206 |
| 6,345,273 B1 | * | 2/2002 | Cochran .................. | 707/4 |
| 6,453,315 B1 | * | 9/2002 | Weissman et al. ...... | 707/5 |
| 6,466,970 B1 | * | 10/2002 | Lee et al. ................ | 707/5 |
| 6,493,702 B1 | * | 12/2002 | Adar et al. .............. | 707/3 |
| 6,496,843 B1 | * | 12/2002 | Getchius et al. ........ | 707/5 |
| 6,523,027 B1 | * | 2/2003 | Underwood ............. | 707/4 |
| 6,606,619 B2 | * | 8/2003 | Ortega et al. ............ | 707/2 |
| 2002/0103809 A1 | * | 8/2002 | Starzl et al. ............. | 707/102 |

\* cited by examiner

Primary Examiner—Uyen Le
Assistant Examiner—Hanh B Thai
(74) Attorney, Agent, or Firm—Brown, Raysman, Millstein, Felder & Steiner LLP

(57) ABSTRACT

A search engine receives query terms from a client. In response, the search engine executes a search on a web directory to identify zero or more documents that match the query terms. The identified documents are associated with one or more categories. The search engine probabilistically selects one of the categories associated with the identified documents. Each message in a message database is also associated with one or more of the categories. The search engine accesses the message database and selects at least one message associated with the selected category. The search engine returns a web page containing references to the documents matching the query terms and the one or more messages selected from the message database to the client.

38 Claims, 4 Drawing Sheets

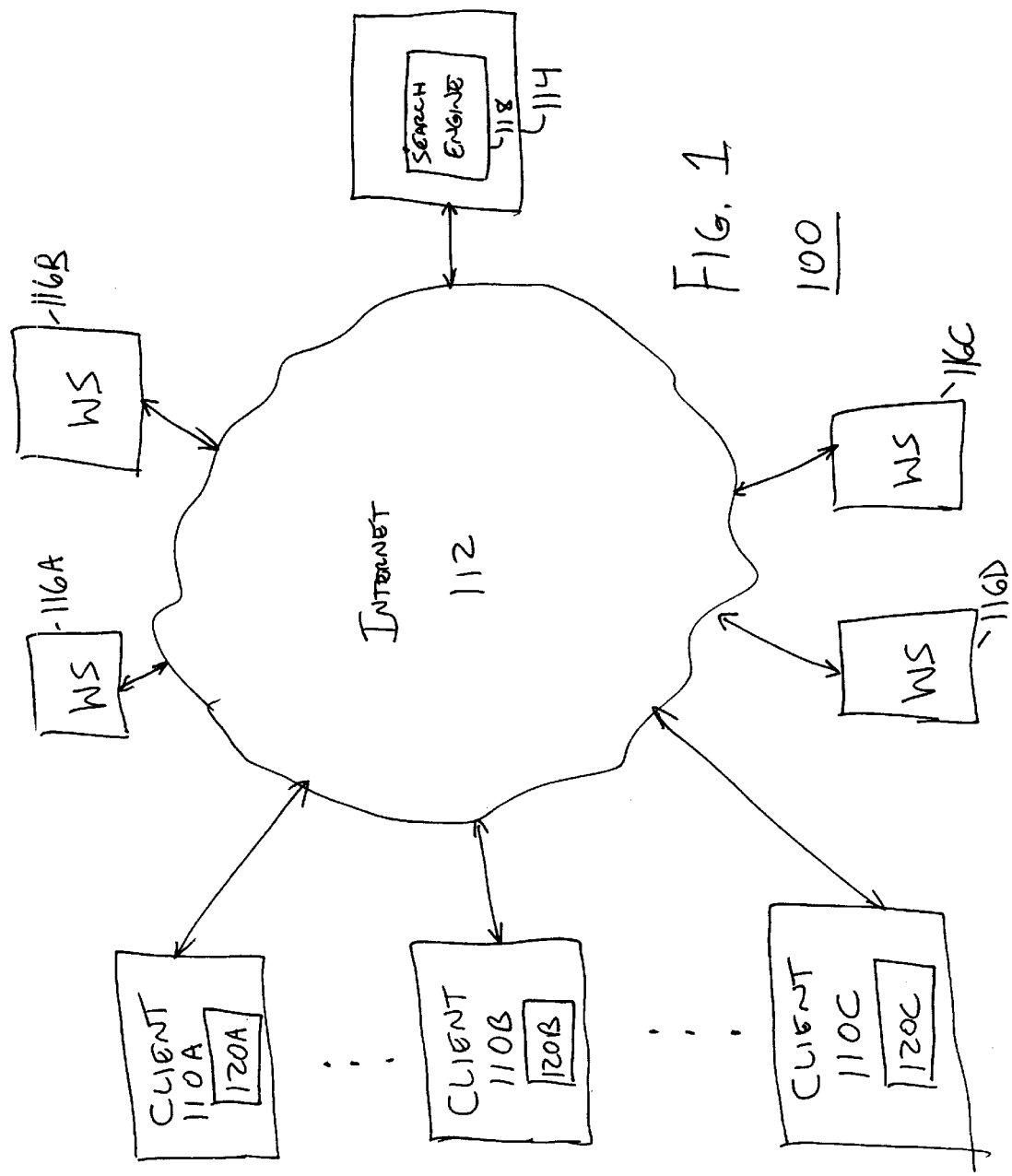

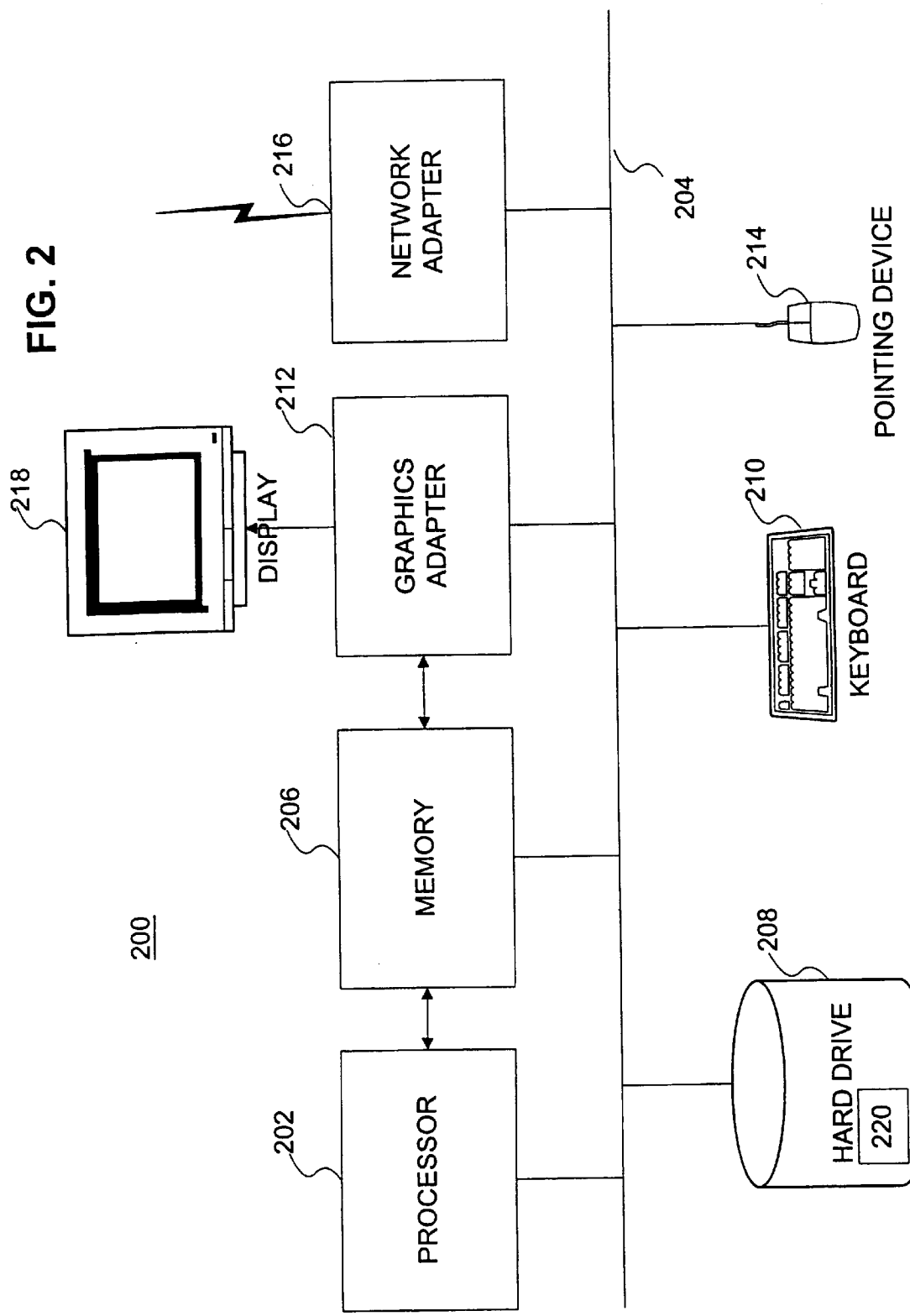

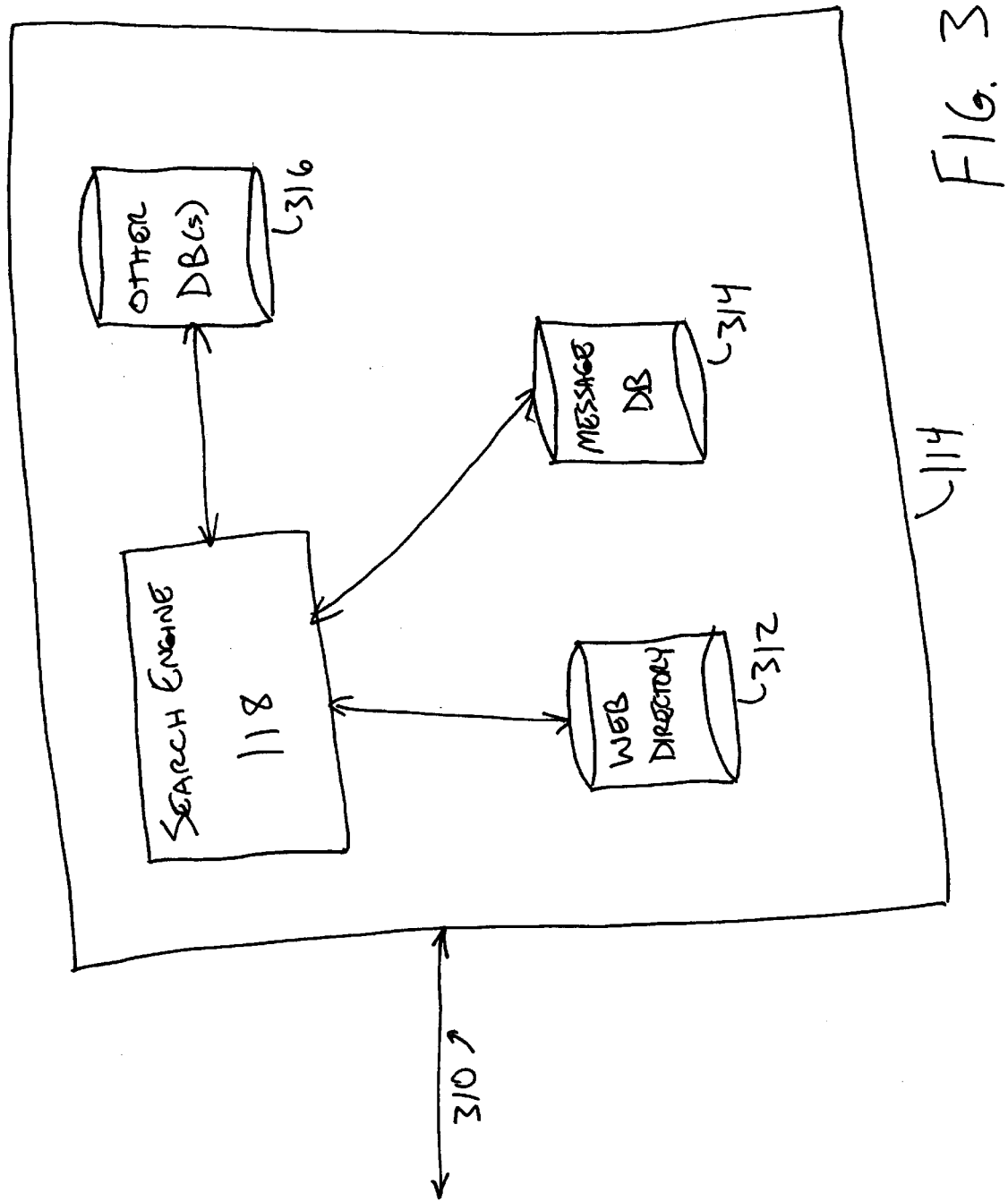

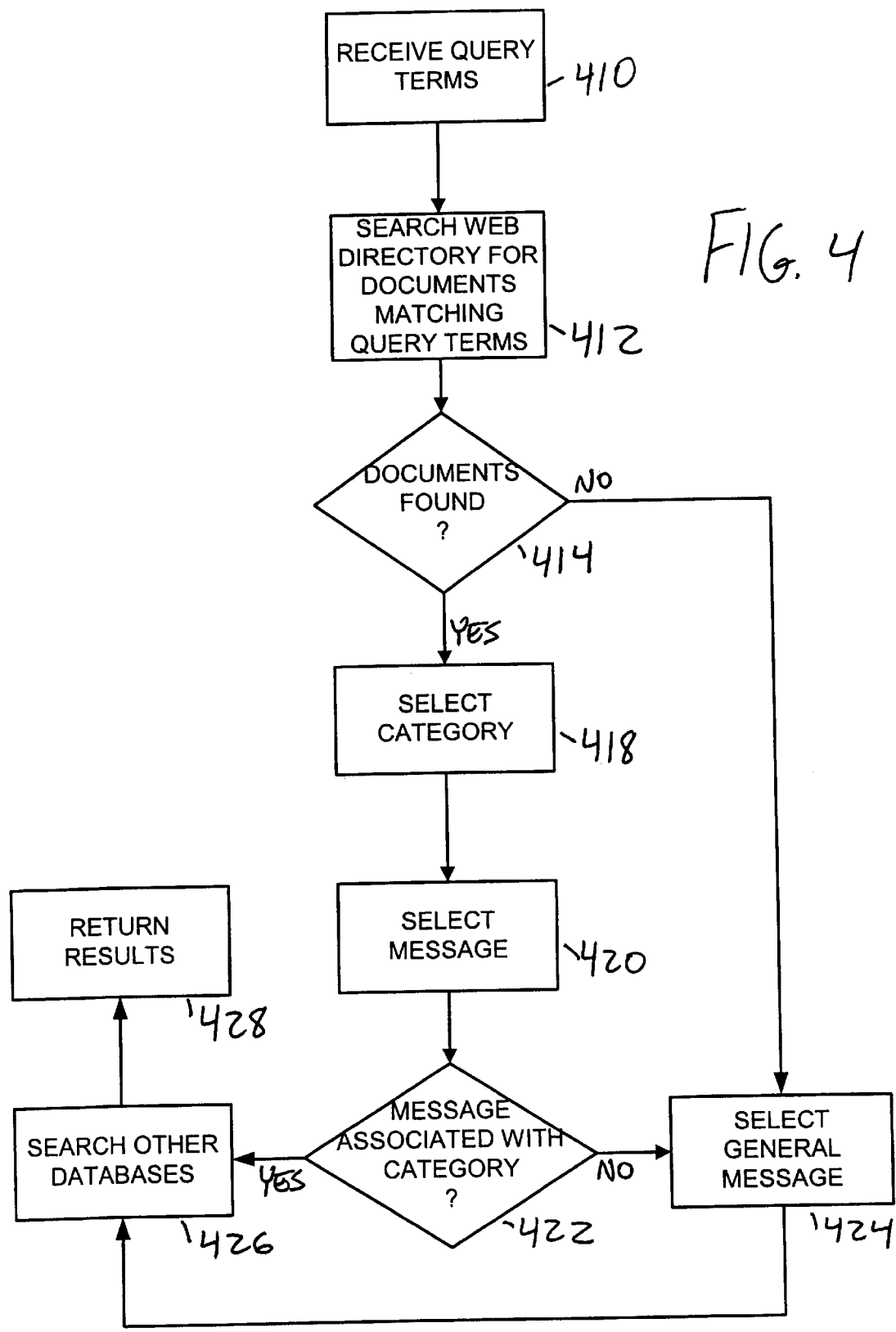

SEARCH ENGINE FOR SELECTING TARGETED MESSAGES

BACKGROUND

1. Field of the Invention

This invention pertains in general to advertising on the Internet and in particular to selecting an advertising message for display in response to a given search query.

2. Background Art

Many web sites provide search engines which accept a keyword-based query from a user and produce a list of matching categories or documents to the user in return. For example, the ALTAVISTA web site contains a search engine that enables a user to execute a query on multiple keywords and receive matching information, such as references to web pages, in response.

Such web sites typically generate revenue by displaying advertising messages, such as banner ads, to the user along with the returned search results. However, users often ignore the ads and may even find the ads irritating. Therefore, web sites strive to display ads related to the search query on the assumption that a user is more likely to show interest in such ads. For example, if the user searches for the phrase "Tahoe ski areas," then the user may tend to respond to ads for products such as skis, hotels near Lake Tahoe, etc. because the user is presumably interested in skiing.

To provide this functionality, web sites typically sell keywords to advertisers. An advertiser's ad is displayed when the user searches on a keyword owned by that advertiser. Since multiple advertisers may desire the same keyword, the web sites often auction desirable keywords to the highest bidders. For example, a web site might auction generic keywords such as "car" and "automobile."

Still, web sites often display ads that are inappropriate in view of the query received from the user. Sometimes, a particular ad is generally appropriate for many queries and the advertiser therefore buys a large number of keywords for the ad. As a result, other advertisers are blocked from using the keywords for their own, possibly more relevant, ads. In a competitive advertising scenario, for example, a dealer of a first make of automobile might buy the keywords corresponding to other makes, thereby intending to entice buyers away from competing makes. As a result, a user may be annoyed to see ads for the first make of automobile when the user is seeking information about another make.

Moreover, advertisers often have little guidance when selecting keywords and seldom know the characteristics of real-world user queries. As a result, advertisers frequently buy overly general keywords like "cars," on which users seldom query. Consequently, often no advertisers have purchased the exact keywords utilized by the users. Therefore, the web site displays general rotation ads instead of targeted ads.

Therefore, there is a need in the art for a way to increase the relevancy of the selected ads to the query terms received from users. Preferably, a solution to this need will overcome the deficiencies of selecting ads via keywords.

DISCLOSURE OF THE INVENTION

The above need is met by a search engine that probabilistically maps a user query into a category, and then uses the category to select a targeted message. The search engine receives the query terms from the user's client computer via the Internet. In response, the search engine executes a search on a web directory to locate zero or more documents that match the query terms. The search engine may also search other directories in order to identify web pages or other documents that match the query terms.

If the search engine has located one or more documents matching the query terms, the search engine determines the categories corresponding to the retrieved documents. In a preferred embodiment of the present invention, each document in the web directory is assigned to a category in a hierarchical directory. In one embodiment, the hierarchical directory is derived from information available through the Open Directory Project (ODP). In general, the ODP is a hierarchical directory of web pages assembled by human operators who review the web pages and assign the pages to certain categories.

In an alternative embodiment of the present invention, the hierarchy in the web directory is completely or substantially flat. A flatter hierarchy simplifies the process of selecting a message because a document belongs to only one or a few categories, instead of belonging to a long chain of ancestor categories.

The search engine preferably next selects one of the categories corresponding to the retrieved documents. In one embodiment of the present invention, the search engine selects the category of one of the returned documents at random. Since categories having more documents matching the query terms are more likely to be selected, the random selection probabilistically selects the category best matching the query terms. In alternative embodiments, the search engine uses one or more other heuristics to bias the category selection.

Once the search engine selects a category, it preferably accesses a message database and selects a message associated with the selected category. The message database preferably holds multiple messages, with each message belonging to one or more of the categories enumerated in the web directory. In a preferred embodiment, the messages are banner ads provided by advertisers. Preferably, the advertisers purchase "shares" in one or more of the categories for each banner ad. When the search engine selects the category in which a given ad has shares, the search engine selects that ad a number of times proportional to the shares of that category owned by the ad.

The search engine preferably returns a web page containing the document references retrieved from the web directory and the one or more messages selected from the message database to the client. Typically, the web page includes a subset of the document references (e.g., the 10 best matches) and at least one banner ad (i.e., the message). Obviously, the web page can include other message types in addition to or instead of the banner ad and/or a different number of references or messages.

BRIEF DESCRIPTION OF THE DRAWINGS

FIG. 1 a block diagram illustrating a typical computing environment according to an embodiment of the present invention;

FIG. 2 is a high-level block diagram illustrating an exemplary embodiment of a computer system for use as a client or web server;

FIG. 3 is a block diagram illustrating a lower-level view of the web server containing the search engine according to an embodiment of the present invention; and FIG. 4 is a flowchart illustrating steps performed by the search engine according to an embodiment of the present invention.

DETAILED DESCRIPTION OF THE PREFERRED EMBODIMENTS

FIG. 1 is a block diagram illustrating a typical computing environment 100 according to an embodiment of the present invention. FIG. 1 illustrates three client computers 110A, 110B, 110C in communication with the Internet 112 using known communications technologies. Multiple other web servers 114, 116 are also in communication with the Internet using known communications technologies. One of the web servers 114 includes a search engine 118. As is known in the art, the Internet 112 is a publicly accessible network of computers and supports communications among the various computers in communication with it.

Although FIG. 1 illustrates only three clients 110, embodiments of the present invention can have thousands, or even millions, of clients simultaneously in communication with the web servers 114, 116 via Internet 112. As is known in the art, a client is typically a personal computer system such as an IBM PC- or Apple Macintosh-compatible computer. A client 110 typically uses a web browser 120 such as NETSCAPE NAVIGATOR from Netscape Communications Corp. or INTERNET EXPLORER from Microsoft Corp. to exchange information with the web servers 114, 116. In a preferred embodiment of the present invention, this information takes the form of hypertext markup language (HTML) web pages transmitted via the hypertext transport protocol (HTTP). However, alternative embodiments of the present invention utilize different transmission techniques and/or exchange different types of information.

As is known in the art, a web server 114, 116 is typically comprised of one or more computer systems adapted to simultaneously interact with multiple clients 110 via the Internet 112. The web servers preferably contain one or more documents referenced via uniform resource locators (URLs), such as "http://www.altavista.com". In one embodiment, a document is a web page containing text, images and/or other types of media. Those of ordinary skill in the art will recognize that the present invention can also be utilized with other types of documents referenced using techniques other than URLs.

As described above, one 114 of the web servers preferably contains a search engine 118. A user preferably uses the web browser 120 to download a web page from the search engine 118 containing a search form. The web browser 120 allows the user to enter query terms into the search form and then transmit the query terms to the search engine 118 via HTTP or another communications protocol. The query terms are typically one or more words or other text strings, but can include other information indicating the types of documents desired by the user.

Upon receiving the search terms, the search engine 118 preferably searches for documents matching the query terms and provides references (e.g., URLs) to the matching documents to the client 110. In a preferred embodiment of the present invention, the search engine 118 derives the search results from documents available from web servers 114, 116 connected to the Internet. However, the exact data domains searched by the search engine 118 are not material to the present invention. The search engine is preferably the ALTAVISTA search engine from AltaVista Co. and available at http://www.altavista.com.

The search engine 118 preferably provides the search results to the client 110 in the form of one or more web pages containing the references to the matching documents. The web pages are typically displayed by the browsing software 120 at the client 110. In addition to the search results, each web page preferably contains one or more messages selected by the search engine 118. A "message" is a communication including text, graphics, sounds and/or any other type of information.

Preferably, one or more of the messages are "targeted" to the query terms in order to make the messages more relevant to the user who initially provided the query. As used herein, the term "targeted" means that the messages are selected and/or generated such that the messages are related to the query terms and/or other information known about the user or client 110.

In a preferred embodiment, the targeted messages contain advertising and are displayed on behalf of one or more advertisers. In one embodiment, the messages are displayed as banner ads that accompany the search results. In alternative embodiments, the messages are displayed in a "popup" window separate from the search results, displayed as search results, and/or displayed in any other practical location or manner.

FIG. 2 is a high-level block diagram illustrating an exemplary embodiment of a computer system for use as a client 110 or web server 114, 116. Illustrated are aft least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The at least one processor 202 may be any specific or general-purpose processor such as an INTEL x86 or POWERPC-compatible central processing unit (CPU). The storage device 208 may be any device capable of holding large amounts of data, like a hard drive, compact disk read-only memory (CD-ROM), DVD, or some other form of fixed or removable storage device. The memory 206 holds instructions and data used by the processor 202. The pointing device 214 may be a mouse, track ball, light pen, touch-sensitive display, or other type of pointing device and is used in combination with the keyboard 210 to input data into the computer system 200. The network adapter 216 couples the computer system 200 to the Internet 112 or another network.

Modules 220 for providing the functionality described herein are preferably stored on the storage device 208, loaded into the memory 206, and executed by the processor 202. Alternatively, hardware or software modules may be stored elsewhere within the computer system 200. As used herein, the term "module" refers to computer program logic and/or any hardware or circuitry utilized to provide the functionality attributed to the modules. The types of hardware and software within the computer system 200 may vary depending upon how the computer system is utilized. For example, a computer system used as a web server 114, 116 is likely to have greater processing power and storage capacity than a computer system used as a client 110.

FIG. 3 is a block diagram illustrating a lower level view of the web server 114 containing the search engine 118. FIG. 4 is a flowchart illustrating steps performed by the search engine 118 according to an embodiment of the present invention. It will be understood by those of skill in the art that the search engine 118 is a module and that the actions and functionality attributed to the search engine herein can be performed by the search engine itself or by other modules within the web server 114. Accordingly, the term "search engine" is intended to include any module or other entity that performs the attributed functions.

Initially, the search engine 118 receives 410 the query terms. In response, the search engine executes 412 a search on a web directory 312 to locate zero or more documents that match the query terms. As used herein, a document "matches" the query terms if the document is in some way related to the query terms. For example, in one embodiment, documents that contain one or more of the query terms match the query terms. Those of skill in the art will recognize that different embodiments of the present invention can use different thresholds of relatedness to determine whether a document matches the query terms.

Preferably, the web directory 312 contains a searchable index of terms contained in documents available from web servers 114, 116 on the Internet 112, and references to those documents. In one embodiment, the web directory 312 contains only a small subset of the total number of documents available. The web directory 312 is preferably optimized to allow fast retrieval of the references to documents matching the query terms.

In a preferred embodiment of the present invention, each document in the web directory 312 is assigned to a category in a hierarchical directory. In one embodiment, the hierarchical directory and category assignments are derived from information available through the Open Directory Project (ODP). In general, the ODP is a hierarchical directory of web pages assembled by human operators who review the web pages and assign the pages to certain categories. More information about the ODP is available at http://www.dmoz.org. In another embodiment, the web directory 312 is derived from one or more alternative data sets.

For example, a document related to snow skiing might be located at "Sports: Skiing: Regional: North America" in the hierarchy. Likewise, a document related to automobiles might be located at "Home: Consumer Information: Automobiles." Note that the hierarchies may be arranged so that certain documents are stored at multiple locations. For example, documents related to "skis" can be found in the categories "Home: Consumer Information: Sports and Recreation: Skiing" and "Sports: Skiing: Backcountry: Telemark: Equipment."

In an alternative embodiment of the present invention, the hierarchy in the web directory 312 is completely or substantially flat. One embodiment flattens the hierarchy by removing regional- and/or geography-based branches. Likewise, another embodiment trims the hierarchy by removing certain broad categories into which many documents fall.

In another embodiment of the present invention, the web directory 312 holds documents in a specialized message hierarchy. The message hierarchy resembles the ODP hierarchy described above except that the hierarchical levels and categories are defined in view of the types of messages available for inclusion with the search results. Thus, in the embodiment wherein the messages contain advertising, the hierarchy categories depend upon the types of ads available. For example, if the ads are placed in broad categories such as "healthcare," "sporting equipment," and/or "automobiles," then the web directory 312 holds the web pages in similar categories. As described below, more specific message categories can lead to more targeted messages.

The search 412 performed by the search engine 118 identifies 414 zero or more documents matching the query terms and references to those documents. A focused query might return documents from only a single category, while less focused queries will probably return documents from several categories. Since queries are often vague, the latter type of query should occur more frequently than the former.

The search engine 118 preferably next selects 418 one or more of the categories corresponding to the identified documents. In one embodiment of the present invention, the search engine 118 randomly selects a category from the identified documents. This embodiment is referred to as the "dart board" because it operates in a manner similar to simply throwing a dart at the identified documents and selecting the category of the document hit by the dart.

An advantage of the dart board approach is that the probability that a category is selected corresponds to the degree to which the query terms match the category. Consider an extreme example: If the query terms match 99 documents in a first category and one document in a second category, then the query terms can be said to match the first category much better than the second category. Correspondingly, there is a 99% chance that the search engine 118 will select the first category and a one percent chance that it will select the second category. Since the category is selected probabilistically, the search engine will occasionally select different categories in response to the same query terms (assuming matching documents are found in multiple categories).

In alternative embodiments, the search engine 118 uses one or more other heuristics to select 418 the category. In one embodiment, the documents and/or categories in the web directory 312 have weight values that the search engine 118 uses to bias the selection. For example, the heuristic can bias the selection towards the category containing the greatest number of documents. In another example, the heuristic can bias the selection by utilizing weight values determined from the number of times a document is selected by a user after being returned as part of a search result. In yet another example, the results of the dartboard approach can be monitored and the selections biased to ensure that each category is selected a certain percentage of the time.

Another alternative embodiment of the present invention uses a heuristic that occasionally selects a hierarchical ancestor of the category in which a document was identified. For example, if a document is found in the category "Home: Consumer Information: Automobiles," this embodiment occasionally selects the "Consumer Information" category. This heuristic accounts for the potential situation wherein a category having children is rarely selected because the query terms frequently match documents in the child category.

Once a category is selected, the search engine 118 preferably accesses a message database 314 and selects 420 a message from the selected category. The message database 314 preferably holds multiple messages, with each message belonging to one or more of the categories enumerated in the web directory 312. Since the category is selected probabilistically, and the message is selected from the category, the same query terms can result in messages selected from different categories.

In a preferred embodiment, the messages are banner ads provided by advertisers. Preferably, the advertisers purchase "shares" in one or more of the categories for each banner ad. Then, when the category in which the ad owns shares is selected, the search engine 118 selects the ad a number of times proportional to the number of shares owned by the ad. For example, if an ad owns 10% of the shares in the "Snow Skiing" category, the search engine 118 will select that ad 10% of the time that the "Snow Skiing" category is selected.

If 422 no messages are associated with the category selected by the search engine 118, or the search engine does not identify 414 any documents that match the query terms; in one embodiment of the present invention the search engine selects 424 a message from a "general" category. In this embodiment, messages own shares in the general category in addition to the other categories. In this manner, the search engine 118 is adapted to provide a non-targeted message if there are no documents or messages related to the query terms.

In an alternative embodiment of the present invention, if no messages own shares in the selected category, the search engine 118 searches the category's hierarchical ancestors for messages. If the search engine 118 does not find a message through this search, then it preferably selects a general message.

After selecting the message, a preferred embodiment of the search engine also searches 426 one or more other databases 316 to identify references to documents matching the query terms. These other databases 316 are similar to the web directory 312, except that the indexed documents in the other databases are not necessarily associated with categories. In this embodiment, the web directory 312 may contain only a small subset of the documents available from servers 114, 116 on the Internet 112 while the other databases contain a much larger subset of the documents. Therefore, the search engine 118 determines the category of the ad from the small set of categorized documents but identifies the majority of the search results from one or more databases 316 of uncategorized documents.

As discussed above, the search engine 118 preferably returns 428 a web page containing the references to the documents matching the query terms and the one or more messages selected from the message database 314 to the client 110. Typically, the web page includes a subset of the document references (e.g., the 10 best matches) and at least one banner ad (i.e., the message). In an alternative embodiment of the present invention, the references returned by the search engine 118 are sorted by category and the selected message is targeted to the category of the returned references. For example, if the search engine 118 identifies 100 references in eight different categories, the search engine returns to the client 110 all or some of the documents in the first selected category along with a message selected from that category. If the user requests additional results pages, the search engine 118 returns documents from a second category, along with a message selected from the second category, etc.

In sum, the present invention selects messages by mapping a practically infinite set of potential query terms to a finite set of categories. The probability that the present invention selects a category is determined by how well the category matches the query terms, and the probability that the present invention selects a message is determined by the number of shares in the selected category owned by the message. Thus, the present invention provides targeted messages without the deficiencies that occur when merely associating ads with keywords.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method of selecting a targeted message, comprising:
   receiving one or more query terms;
   accessing a web directory holding references to documents, each document associated with one or more categories;
   identifying a set of documents referenced in the web directory that match the one or more query terms;
   probabilistically selecting a category responsive to the one or more categories associated with the documents identified;
   accessing a database of messages, the messages each associated with at least one category; and
   selecting a message from the database of messages, the selected message associated with the selected category.

2. The method of claim 1, wherein the database of messages is independent of the web directory.

3. The method of claim 1, further comprising:
   defining a hierarchy for the one or more categories.

4. The method of claim 3, wherein the category hierarchy is substantially flat.

5. The method of claim 3, wherein the categories in the hierarchy are defined responsive to a plurality of message types.

6. The method of claim 3, wherein the step of selecting the category comprises:
   selecting a hierarchical ancestor of a category associated with a document in the set.

7. The method of claim 1 wherein the step of selecting a category comprises:
   randomly selecting the category from among the one or more categories associated with the documents in the set.

8. The method of claim 1, wherein the step of selecting a category comprises:
   selecting the category responsive to weight values associated with the categories in the set.

9. The method of claim 1, wherein the step of selecting a category comprises:
   selecting the category responsive to weight values associated with the documents in the set.

10. The method of claim 1, wherein the step of selecting a message from the database of messages comprises:
    selecting the message responsive to a number of shares of the selected category owned by the message.

11. The method of claim 1, wherein there are no messages associated with the selected category and wherein the step of selecting a message from the database of messages comprises:
    selecting a general message associated with a general category.

12. The method of claim 1, wherein the one or more query terms are received from a client and further comprising:
    sending references to the identified documents and the selected message to the client.

13. The method of claim 12, further comprising:
    sorting the identified documents by an associated category of each document; and
    sending the references to the identified documents to the client in the sorted order;
    wherein the category is selected responsive to the category of the documents sent to the client.

14. The method of claim 1, wherein probabilistically selecting a category responsive to the one or more categories associated with the documents identified comprises non-deterministically selecting a category responsive to the one or more categories associated with the documents identified.

15. A search engine for selecting a targeted message, the search engine comprising:
    a receiving module for receiving one or more query terms from a client;
    a web directory access module for accessing a web directory holding references to documents, each document associated with one or more categories, and for identifying a set of documents referenced in the web directory that match the one or more query terms;

a category selection module for probabilistically selecting a category responsive to the one or more categories associated with the documents identified by the web directory access module; and a message database access module for accessing a database of messages, the messages each associated with at least one category, and for selecting a message associated with the category selected by the category selection module.

16. The search engine of claim 15, wherein the categories in the web directory are arranged hierarchically.

17. The search engine of claim 16, wherein the category hierarchy is substantially flat.

18. The search engine of claim 16, wherein the categories in the hierarchy are defined responsive to the types of messages held in the message database.

19. The search engine of claim 16, wherein the category selection module selects a hierarchical ancestor of a category associated with a document in the set.

20. The search engine of claim 15, wherein the category selection module selects the category at random from among the one or more categories associated with the documents in the set.

21. The search engine of claim 15, wherein the category selection module selects the category responsive to weight values associated with the one or more categories.

22. The search engine of claim 15, wherein the category selection module selects the category responsive to weight values associated with the documents in the set.

23. The search engine of claim 15, wherein the message database access module selects the message responsive to shares of the selected category owned by messages in the database.

24. The search engine of claim 15, wherein, if there are no messages associated with the selected category, the message database access module selects a message associated with a general category.

25. The search engine of claim 15, further comprising:

a sending module for sending references to the identified set of documents and the selected message to the client.

26. The search engine of claim 25, wherein the sending module further comprises:

a sorting module for sorting the identified set of documents matching the query terms by the documents' associated categories;

wherein the sending module sends the references to the identified set of documents to the client in the sorted order and wherein the category selection module selects the category responsive to the category of the references to documents sent to the client.

27. A computer program product comprising:

a computer-usable medium having computer-readable code embodied therein for selecting a targeted message, the computer-readable code comprising:

a receiving module for receiving one or more query terms from a client;

a web directory access module for accessing a web directory holding references to documents, each document associated with one or more categories, and for identifying a set of documents referenced in the web directory that match the one or more query terms;

a category selection module for probabilistically selecting a category responsive to the one or more categories associated with the documents identified by the web directory access module; and a message database access module for accessing a database of messages, the messages each associated with at least one category, and for selecting a message associated with the category selected by the category selection module.

28. The computer program product of claim 27, wherein the categories in the web directory are arranged hierarchically.

29. The computer program product of claim 28, wherein the category hierarchy is substantially flat.

30. The computer program product of claim 28, wherein the categories in the hierarchy are defined responsive to the types of messages held in the message database.

31. The computer program product of claim 28, wherein the category selection module selects a hierarchical ancestor of a category associated with a document in the set.

32. The computer program product of claim 27, wherein the category selection module selects the category at random from among the one or more categories associated with the documents in the set.

33. The computer program product of claim 27, wherein the category selection module selects the category responsive to weight values associated with the one or more categories.

34. The computer program product of claim 27, wherein the category selection module selects the category responsive to weight values associated with the documents in the set.

35. The computer program product of claim 27, wherein the message database access module selects the message responsive to shares of the selected category owned by messages in the database.

36. The computer program product of claim 27, wherein, if there are no messages associated with the selected category, the message database access module selects a message associated with a general category.

37. The computer program product of claim 27, further comprising:

a sending module for sending references to the identified set of documents and the selected message to the client.

38. The computer program product of claim 37, wherein the sending module further comprises:

a sorting module for sorting the identified set of documents matching the query terms by the documents' associated categories;

wherein the sending module sends the references to the identified set of documents to the client in the sorted order and wherein the category selection module selects the category responsive to the category of the references to documents sent to the client.

* * * * *